Feb. 22, 1955 R. R. L. GEFFROY 2,702,561
PRESSURE REGULATING APPARATUS FOR CUTTING
AND WELDING TORCHES AND THE LIKE
Filed May 21, 1949 3 Sheets-Sheet 1
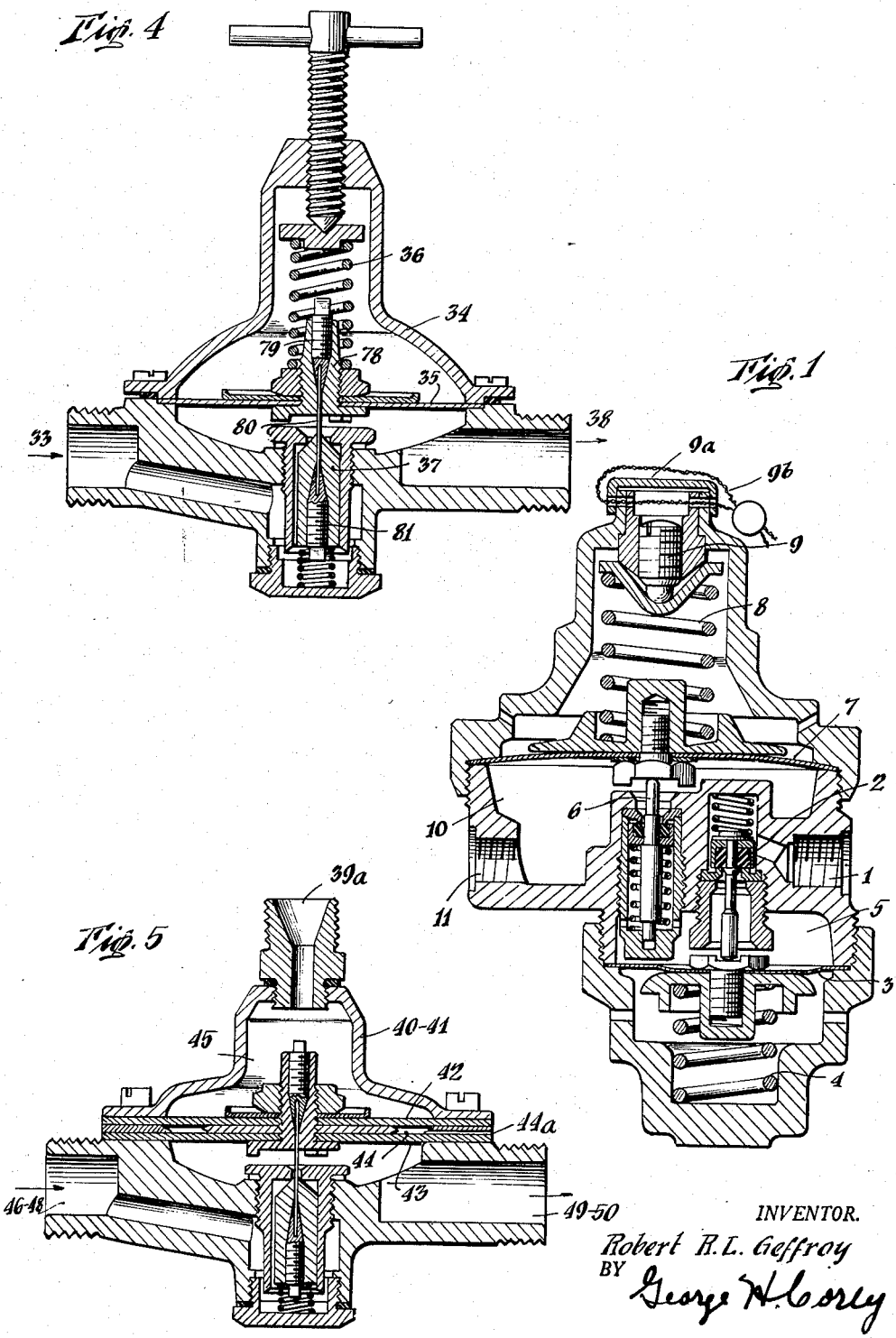
INVENTOR.
Robert R. L. Geffroy
BY George H. Corley
ATTORNEY

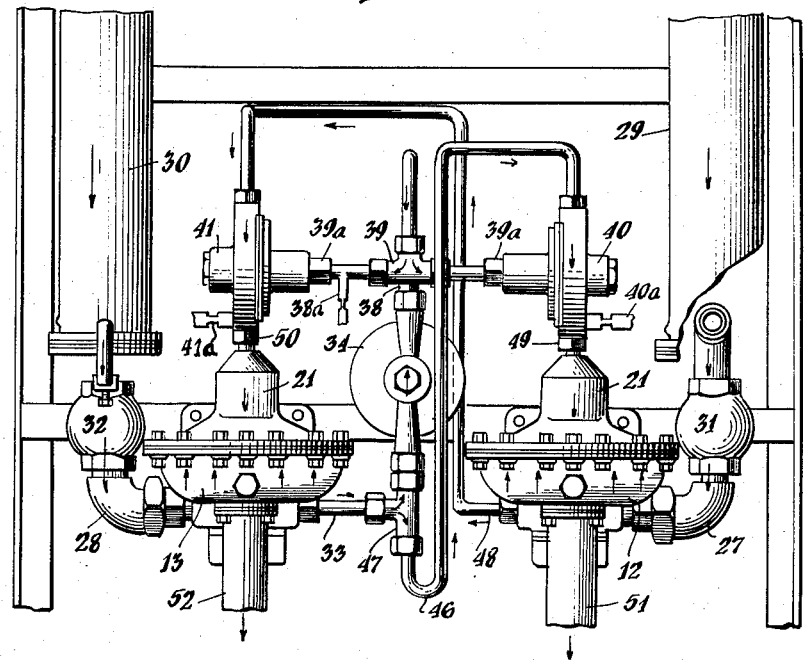
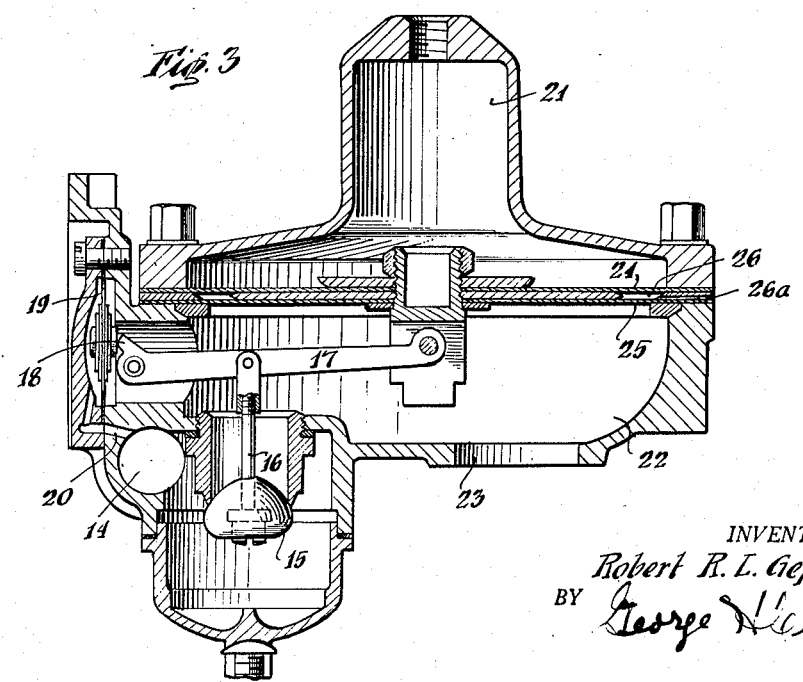

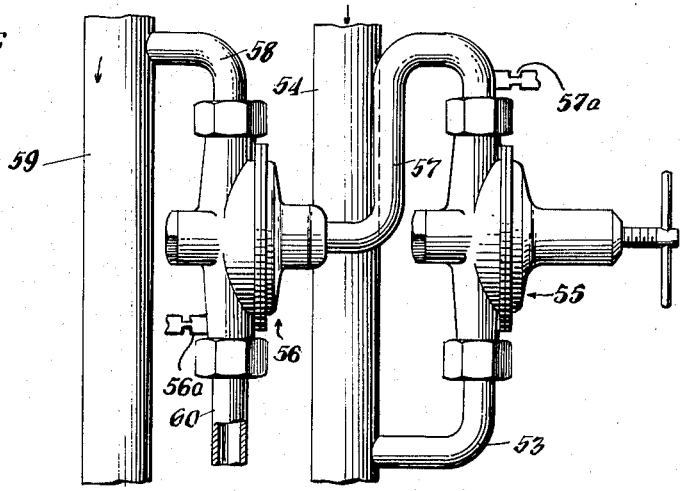
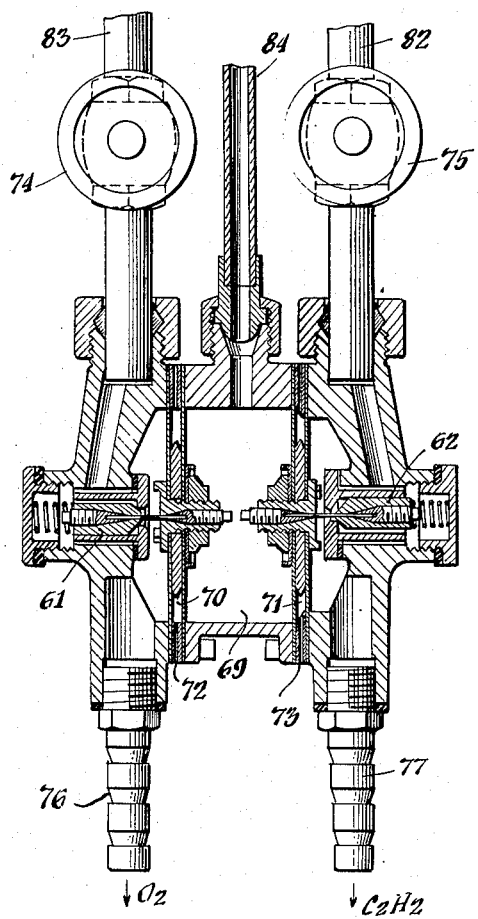

United States Patent Office 2,702,561
Patented Feb. 22, 1955

2,702,561

PRESSURE REGULATING APPARATUS FOR CUTTING AND WELDING TORCHES AND THE LIKE

Robert René Louis Geffroy, Neuilly-sur-Seine, France

Application May 21, 1949, Serial No. 94,704

Claims priority, application France May 27, 1948

4 Claims. (Cl. 137—98)

This invention relates to pressure regulating apparatus and particularly to apparatus for controlling the pressure of oxygen and/or fuel supplied to welding or cutting torches or the like.

Oxygen is commonly supplied to torches of the type described from individual tanks whose pressure when filled is in the neighborhood of 150 kg./cm.$^2$. It is common practice to use oxygen from such a tank until its pressure drops to approximately 3 kg./cm.$^2$. One type of conventional pressure regulator commonly used to supply a torch from such a tank is a two-stage regulator. The first stage reduces the pressure to approximately 40 kg./cm.$^2$, and the second stage reduces the pressure to whatever operating pressure is selected by the operator of the torch. In such systems, a wide range of working pressures is used at the torch. The working pressure is selected by the torch operator by manipulation of a pressure adjustment on the second stage of the regulator, and is checked by a pressure gauge. The regulator is not required to hold the pressure constant over a wide range of rates of flow. If the pressure varies from the selected value, the operator is informed of the variation by the gage, and he can always adjust the regulator to correct it.

In my copending application entitled, "Method and Apparatus for Oxygen Cutting of Metals," Serial No. 94,703, filed May 21, 1949, and assigned to the assignee of the present application, there is disclosed an oxygen cutting system in which oxygen is supplied to the cutting torch at a constant pressure which cannot be varied by the operator. This system requires that the oxygen pressure at the torch be held constant over a wide range of rates of flow. The pressure regulators used with previous welding or cutting systems cannot be used with this constant pressure system without modification, because the range of pressure variation with the rate of flow in such previous regulators is too great.

In my copending application Serial No. 649,704, filed February 23, 1946, entitled, "Oxyacetylene Installations for Welding, Cutting or the Like," now Patent No. 2,533,729 dated December 12, 1950, which is assigned to the assignee of the present application, I have disclosed an oxygen distributing system, in which oxygen is supplied at a constant pressure to several welding or cutting torches, and in which the pressure regulating apparatus is effective to insure that the pressure and the rate of flow to each torch are not affected by variations in the rate of flow to the other torches.

An object of the present invention is to provide an improved pressure regulator for apparatus of the type described, which is capable of maintaining a substantially fixed outlet pressure over a wide range of variation of the rate of flow.

Another object is to provide an improved oxygen and/or fuel gas distributing system of the type described in my copending application Serial No. 649,704, now Patent No. 2,533,729 previously mentioned.

A further object is to provide, in such a system, improved means for preventing the backward flow of oxygen or fuel gas from one torch to another.

A further object is to improve such a system by simplification of the pressure regulating and flow controlling apparatus therein.

In accordance with the present invention, a constant pressure regulator suitable for use in a system of the type described in my copending application Serial No. 94,703, is provided by suitably modifying a two-stage regulator of conventional construction. The modifications include: (1) adjustment of the first stage of the regulator to take the greater part of the pressure drop in the first stage; (2) careful control of the relationship between the area of the diaphragm and the area of the valve in the second stage of the regulator; and (3) the provision of means for sealing the adjustment of the second regulator stage so that it cannot be changed by unauthorized persons.

One form of apparatus for regulating both the fuel gas and oxygen pressures, constructed in accordance with the present invention, comprises main regulators in the oxygen and fuel gas supply lines. A master pilot valve controls the pressure in a portion of a bleed line extending between the oxygen supply line at the upstream side of the regulator therein and a restricted outlet leading to the atmosphere. The regulated pressure in that portion of the pilot line is used to control two slave pilot valves. One slave pilot valve is connected in a fuel gas bleed line and controls the pressure in a portion thereof. This controlled fuel gas pressure is used to control the main oxygen pressure regulator. The other slave pilot valve controls the pressure in an oxygen bleed line, which controlled oxygen pressure is utilized to control the main fuel gas regulator. By virtue of this arrangement, maintenance of both the oxygen and fuel gas supply pressures is necessary to continued operation of both the main regulators. If either supply pressure fails, the other main regulator shuts down.

In the system just described, the master pilot valve is so constructed that it inversely compensates the regulated pressure for variations in the inlet pressure. That is, a decrease in the inlet pressure causes an increase in the regulated pressure. This characteristic is utilized to compensate for variations in the pressure drop through the lines connecting the pressure regulator to the torch. This compensation insures a constant pressure supply to the torch, regardless of variations in the supply pressure.

In accordance with another modification of the present invention, each torch is provided with a dual regulator which controls both the fuel and oxygen pressures at the torch. This dual regulator is controlled by the pressure in a bleed line connected to the oxygen supply and regulated by a slave pilot valve which is in turn controlled by the pressure in a bleed line connected to the fuel gas supply and regulated by a master pilot valve. In this modification also, continued operation of both regulators requires a maintenance of both the oxygen and the fuel gas supply pressures. Since the pressures are regulated at the torches in this modification, it is unnecessary to take into account the pressure drops between the regulators and the torches.

In the accompanying drawings,

Fig. 1 is a cross-sectional view of a pressure regulator for an individual torch constructed in accordance with the present invention.

Fig. 2 is an elevational view of an oxygen and fuel pressure regulating and distributing system constructed in accordance with the present invention.

Figs. 3, 4 and 5 are cross-sectional views of individual pressure regulators which are used in the system of Fig. 2.

Fig. 6 illustrates a pilot regulator system for the control of oxygen and fuel supplies to a number of remotely located individual regulators.

Fig. 7 is a view, partly in section and partly in elevation, of an individual dual oxygen and fuel pressure regulator suitable for use in connection with the pilot regulator of Fig. 6.

Referring now to Fig. 1, there is shown a two-stage regulator suitable for use in connection with an individual welding or cutting outfit in which a single tank or group of tanks supplies oxygen to a single torch.

Most of the structure of the regulator shown in Fig. 1 is conventional, and this conventional structure will first be briefly described. A fluid, such as oxygen, is supplied to the regulator through an inlet 1 which communicates with a chamber above a valve 2 operated by a diaphragm 3. Valve 2 is biased to open position by a spring 4. The pressure in a chamber 5 at the outlet side of valve 2 acts on diaphragm 3 in a valve closing direction, in opposition to the spring 4. It will be readily understood that the valve 2 and diaphragm 3 cooperate to regulate the pressure in chamber 5, maintaining it at a value determined by the strength of spring 4. Valve 2, diaphragm 3 and spring 4 are the principal parts of the first stage of the regulator.

The oxygen flows from chamber 5 through a second valve 6, operated by a second diaphragm 7. A spring 8 biases the diaphragm 7 and valve 6 in a valve opening direction, and is opposed by the pressure in the chamber 10 under the diaphragm 7 and by the pressure in chamber 5 acting on the under side of valve 6. Valve 6, diaphragm 7 and spring 8 are the principal parts of the second stage of the regulator. Oxygen flows from the chamber 10 through an outlet connection 11.

The tension of the spring 8 is determined by the setting of a screw 9. Access to the screw 9 can be had only by removing a cap 9a held in place by a sealed wire 9b. When the cap 9a is sealed in place, the pressure setting of the second stage of the regulator cannot be disturbed without breaking the seal.

In the regulators of the prior art, a manually operable setting handle was used where the applicant provides the screw 9 under the sealed cap 9a. The other details of construction of the regulator shown in Fig. 1 are well known, with the exception of the relationships between the areas and pressures set forth below.

As previously pointed out, such regulators are used in connection with oxygen tanks where the absolute inlet pressure to the regulator varies between 150 and 3 kg./cm.² In such an arrangement, the spring 4 is commonly selected or set to maintain the pressure in chamber 5 at approximately 40 kg./cm.² When the inlet pressure drops below 40 kg./cm.², the valve 2 remains open and all the pressure regulation is done by the second stage valve 6. It is possible to maintain a fairly constant outlet pressure over a wide range of rates of flow, as long as the pressure in chamber 5 remains constant. When the inlet pressure of the regulator drops below the pressure for which the first stage is set, then the pressure in chamber 5 falls, with a resulting drop in the outlet pressure in chamber 10.

In order to study this phenomenon from a mathematical standpoint, let $S$ represent the effective area of the diaphragm 7 exposed to the pressure in the chamber 10 and let $s$ represent the area of the valve 6 exposed to the difference in pressure between chamber 5 and chamber 10. Let $p$ represent the inlet pressure, $p_1$ the pressure in chamber 5 and $p_2$ the pressure in chamber 10. The relation between the areas $S$ and $s$ and the pressure variations $\Delta p_1$ and $\Delta p_2$ may be expressed as follows:

$$\Delta p_1 s = \Delta p_2 S$$

or $$\Delta p_2 = \Delta p_1 \frac{s}{S}$$

It has been found by tests that in order to obtain a regulated pressure in the neighborhood of 0.3 to 0.4 kg./cm.² absolute with a permissible variation of 30 gm./cm.² over a range of flows from 500 to 20,000 liters per hour, the valve 6 must have a diameter of at least 5 millimeters. The effective area $S$ in a regulator of suitable dimensions, is approximately 30 square centimeters.

When a conventional regulator is used as described above, the pressure $p_1$ may vary between 40 and 3 kg./cm.² as the oxygen cylinder is emptied. In such a case, using valve and diaphragm areas as described above, the variation of the outlet pressure $p_2$ would be equal to:

$$\Delta p_2 = 37 \times \frac{(0.25)^2 \pi}{30} = 0.24 \text{ kg./cm.}^2$$

Such a variation of pressure is not permissible in a constant pressure system such as described in the previously mentioned application Serial No. 94,703.

According to the present invention, a modified regulator of this type can be used, but the spring 4 must be set or selected to regulate the pressure $p_1$ at a value of 4 kg./cm.² instead of 40.

With such a setting, the variation in $p_1$ as the oxygen cylinder empties is the difference between 4 and 3 kg./cm.² Hence the variation in the outlet pressure $p_2$ becomes:

$$\Delta p_2 = 1 \times \frac{(0.25)^2 \pi}{30} = 0.0065 \text{ kg./cm.}^2$$

Such a variation in outlet pressure is permissible in a constant pressure system of the type described. It is, in fact, less than the error in the pressure reading that would be made by a conscientious and able operator using a conventional pressure gauge.

The area of the valve in the second stage regulator may be determined from the known variations in the outlet pressure of the first stage regulator, the desired accuracy of regulation of the second stage outlet pressure, and the area of the second stage diaphragm. In accordance with the following equation, which is derived from the preceding one (assuming that the accuracy is $\Delta p_2 = 0.05 p_2$)

$$s \leq \frac{0.05 p_2 S}{\Delta p_1}$$

Summarizing, a pressure regulator of the type described may be utilized to produce a constant outlet pressure with a wide variation in inlet pressure if substantially all the pressure drop is taken in the first stage of the regulator and the unbalanced area of the second stage valve is small with respect to the diaphragm area. A regulator so modified may have its second stage adjustment sealed as described herein, and will supply oxygen or other gas at a substantially constant pressure without attention from the operator. For example, such a regulator has been used to provide an outlet gauge pressure of 300 gm./cm.², with a variation of only 30 gm./cm.² over a range of flows from 500 to 20,000 liters per hour. Furthermore, the regulator is simplified by the elimination of the low pressure gauge and the manual adjustment.

An individual welding or cutting outfit supplied with oxygen by means of a regulator of the type described in Fig. 1, can advantageously be equipped with a fuel gas pressure regulator of similar construction. For fuel gases, the pressure regulation problem is more easily solved because the variations in the supply pressure are always much smaller and are sometimes completely absent. For example, liquefied gases, such as propane and butane have substantially constant pressures, determined by the vapor pressure of the liquid. The maximum pressure of acetylene in cylinders is much smaller than that of oxygen, while the pressure variations of acetylene from carbide generators is less than 0.5 kg./cm.² Many pressure regulators are available which are suitable for use in the fuel gas line, with or without a sealed adjustment as described above.

An arrangement for supplying oxygen from a single tank or group of tanks to a number of cutting or welding torches is described in my copending application Serial No. 649,704, now Patent No. 2,533,729, previously mentioned. In that system, a central pressure regulator is provided which is sufficiently accurate to permit all the required output variations of the various torches connected thereto without disturbing the operation of the other torches, and without requiring any individual adjustment of the pressure at the torches by the torch operators.

There is shown in Fig. 2 an improved pressure regulating apparatus which is suitable for use as the central pressure regulating apparatus in an oxygen and fuel gas distributing system of the type just mentioned. In this arrangement, the operation of both the oxygen and fuel regulators is dependent upon the continuance of the supply pressure of both the oxygen and the fuel. Hence, if either supply pressure fails, the flow of both gases is cut off. With this arrangement, it is unnecessary to provide the check valves or other anti-backflow devices which have previously been required in oxyacetylene appliances.

Referring now to Fig. 2, there is shown a main acetylene regulator 12 and a main oxygen regulator 13. The details of construction of a regulator such as the regulators 12 and 13 are shown in Fig. 3. Referring briefly to Fig. 3, the gas enters by an inlet 14 and passes through a valve 15 connected by a stem 16 to a lever 17. One arm 18 of the lever 17 bears against a button carried by a compensating diaphragm 19. The opposite face of diaphragm 19 is subjected to the inlet pressure by means of a duct 20 communicating with the inlet 14. The main diaphragm has its upper surface subjected to the pressure in a chamber 21 which is maintained constant by means to be described below. The main diaphragm is connected to the right end of lever 17 and is subject on its lower side to the pressure in a chamber 22 at the outlet of valve 15. Gas flows from the chamber 22 through an outlet passage 23. Any variation in the inlet pressure, which acts upwardly on valve 15, is balanced by the opposing action of the same inlet pressure on the compensating diaphragm 19.

The main diaphragm of the regulator shown in Fig. 3 consists of two diaphragms 24 and 25. The space 26 between the two diaphragms is connected with the atmosphere by means of one or more openings 26a. This construction avoids mixing of the gases in the chambers 21 and 22 in case of accidental leaking of one of the diaphragms.

Connected in the acetylene supply line 27 ahead of the main regulator 12 is a filter 29. A similar filter 30 is connected in the oxygen supply line 28 ahead of the main oxygen regulator 13. Also connected in the supply lines ahead of the main regulators 12 and 13 are shut-off valves 31 and 32, respectively. The supply lines 27 and 28 are connected to sources of fuel gas and oxygen, respectively, provided with preliminary pressure regulators of conventional construction (not shown).

An oxygen bleed line 33 connected to the supply line 28 upstream from the regulator 12 supplies oxygen to a master pilot regulator 34.

The master pilot regulator 34 is shown in detail in Fig. 4. It comprises a diaphragm 35, biased in a valve opening direction by a spring 36 and operating a valve 37 so as to maintain a constant pressure in the line 38 downstream from the regulator 34. In order to obtain high sensitivity, the line 38 downstream from the pilot regulator 34 is provided with a permanent restricted leak 38a. The line 38 supplies oxygen at constant pressure to slave pilot regulators 40 and 41 through connections 39 and 39a.

The diaphragm 35 is clamped to a block 78 having a conical inside bore. The valve 37 is provided with a similar inside bore. Screws 79 and 81 having tapered ends provided with blind recesses are inserted into the conical bores in block 78 and valve 37 respectively. A piano wire 80 is inserted through suitable apertures in the block 78 and valve 37 so that its ends project within the blind recesses in the screws 79 and 81. The angles of the tapers on the conical screws 79 and 81 are made slightly smaller than the angles of the tapers in the bores in block 78 and valve 37, so that as the screws 79 and 81 are tightened, the blind holes are collapsed and squeeze the ends of the piano wire 80, thereby fastening the diaphragm 35 and the valve 37 tightly to the piano wire.

The details of construction of the regulators 40 and 41 are shown in Fig. 5. They are generally similar to the regulator 34, but the spring and its adjusting mechanism are removed, and two diaphragms 42 and 43 are used in place of the diaphragm 35. The space 44 between the diaphragms is connected to the atmosphere through one or more openings 44a. The upper surface of diaphragm 42 is subject to the pressure in a chamber 45 supplied with oxygen from connection 39a. (In the regulator 40, a single diaphragm might be used, since both its sides are subject to oxygen under pressure. However, since it is desirable to keep the characteristics of the regulators 40 and 41 alike, it is best to use double diaphragms in both.)

Oxygen is supplied to the regulator 40 through conduits 46 and 47 which connect to the oxygen bleed line 33. Regulator 41 is supplied with acetylene through bleed line 48 which is connected to the acetylene supply line 27 upstream from the regulator 12. Outlet 49 of regulator 40 discharges into the chamber 21 of the main acetylene regulator 12, and the outlet 50 of regulator 41 is connected to the corresponding chamber 21 of the oxygen regulator 13.

Reviewing briefly, both the regulators 40 and 41 are controlled by oxygen under pressure regulated by the master pilot regulator 34. Regulator 40 supplies oxygen at constant pressure to the chamber 21 of acetylene regulator 12. Regulator 41 supplies acetylene at constant pressure to chamber 21 of oxygen regulator 13. Alternatively, the inlet of master pilot regulator 34 could be connected to acetylene bleed line 48 instead of to oxygen bleed line 33.

The regulators 40 and 41 are provided with small leaks 40a and 41a, respectively, to insure sensitiveness of control of the pressure in the respective chambers 21.

Under normal conditions, the acetylene regulator 12 controlled by the oxygen pressure in its chamber 21 discharges acetylene at a fixed pressure through its outlet pipe 51. Similarly, the oxygen regulator 13 controlled by the acetylene pressure in its chamber 21 supplies to its outlet pipe 52 oxygen at a fixed pressure.

If the pressure of the oxygen source fails, the pilot regulator 34 is not supplied with oxygen and consequently the slave pilot regulator 40 is no longer supplied with oxygen under pressure. Consequently it cuts off the supply of gas to the chamber 21 of the main acetylene regulator 12, which thereupon closes its valve 15. Hence the pressure is reduced in both the conduits 51 and 52 at the same time, so that neither gas can return through the other line because of failure of the pressure of the other source.

If the acetylene supply pressure fails, then slave regulator 41 is no longer supplied through the bleed line 48, and the main oxygen regulator is shut down thereby reducing the pressure in conduit 52 substantially simultaneously with the pressure drop in conduit 51.

The arrangement described above might be simplified by removing the regulator 40 and connecting the chamber 21 of regulator 12 directly to the conduit 38. However, such an arrangement has an increased tendency toward unbalance due to the lack of symmetry in the control lines.

In supplying oxygen and fuel gas to welding or cutting torches it is best to use an acetylene pressure slightly higher than the oxygen pressure. Tests of oxygen cutting torches have been made which show that good results are obtained when the absolute acetylene pressure is 1.35 kg./cm.$^2$ and the absolute oxygen pressure is 1.3 kg./cm.$^2$. This difference in the outlet pressures may easily be obtained by using unequal areas on the diaphragms in the regulators 12 and 13 or in the regulators 40 and 41, or in both sets of regulators.

As previously mentioned, the fuel gas and oxygen conduits 27 and 28 are supplied from suitable sources, e. g., pressure tanks of well known construction, through preliminary pressure regulators of conventional form (not shown in Fig. 2). One suitable type of regulator would be like that shown in Fig. 1, without the modifications characteristic of the present invention. Such conventional regulators have a characteristic decrease in their discharge pressure as the flow of gas through them increases. This characteristic decrease in pressure is well known and is due to the fact that the valve must open wider to permit an increased flow. As the valve opens wider, the spring which biases the valve open expands, thereby decreasing the force which it applies to the valve. For any stable condition, it will be readily understood that the regulated pressure acting on the diaphragm in opposition to the spring must decrease as the spring expands. This decrease in pressure is not large in well designed regulators.

Where the regulating apparatus shown in Fig. 2 is located at some distance from the torches it supplies, the pressure drop through the conduits 51 and 52 may be considerable, particularly at the higher rates of flow. This pressure drop can of course be minimized by using large size conduits. In accordance with the present invention the master pilot regulator 34 is constructed to take advantage of the pressure decreasing characteristic of the preliminary pressure regulator in such a manner as to provide an increasing discharge pressure from the regulators 12 and 13 with increasing flow. This increasing pressure characteristic may be suitably matched with the pressure drop encountered in the lines 50 and 51 in such a manner as to counteract the pressure drop in those lines and provide a substantially constant pressure at the torch.

Referring to the pilot regulator 34 (Fig. 4) it may be seen that as the inlet pressure at 33 decreases, the force tending to close the valve 37 decreases, so that valve 37 moves in an opening direction until the decreased closing force on valve 37 is balanced by an increased closing force on diaphragm 35 due to the opening of the valve and the increased outlet pressure produced by that opening.

Let S be the effective area of diaphragm 35 subject to the pressure regulated by regulator 34. Let s be the area of valve 37 which is subject to the difference between the inlet and outlet pressures of regulator 34, acting in an upward direction. This area s is substantially the area of the opening in the valve seat. Let $\Delta p$ equal the variation of the inlet pressure known to occur at 33 and $\Delta p_1$ be the permissible variation of outlet pressure at 38. The relationship between the pressure variations of the two areas defined above may be expressed as:

$$s = \frac{\Delta p_1 S}{\Delta p}$$

For example, one conventional regulator, such as that discussed above, when set for a regulated pressure of 2 kg./cm.$^2$ has a variation of approximately 0.3 kg./cm.$^2$ over a range of rates of flow from 500 to 20,000 liters per hour. If the effective area of diaphragm 35 is 15 cm.$^2$ and if a pressure increase of 0.01 kg./cm.$^2$ is required at the outlet 38 in order to produce a constant pressure at the torches over the desired range of rates of flow, then the area $s$ of the seat against which the valve 37 works must be:

$$s = 0.01 \times \frac{15}{0.3} = 0.5 \text{ cm.}^2$$

In other words, the seat must have a diameter of 8 mm.

In the modification of the invention just described, the operation of the torches is independent of the variations in the rates of flow of the oxygen and the fuel gas. Furthermore, there is no danger of one of the gases flowing backward in the other supply line due to failure of the other source of pressure. In such a system, the hoses connecting the torches to the supply lines may be connected to shut-off valves of large cross-section located at the ends of the branch supply lines. Individual pressure adjusting and regulating appliances at the torches are not required. Furthermore, anti-backflow devices at the torches may also be omitted.

Another modification of the present invention is illustrated in Figs. 6 and 7. In this arrangement, the outlet pressures are regulated at each torch by means of a system of pilot lines which connects the gas sources with the several torches, independently of the gas supply lines. These pilot lines distribute a gas at a constant pressure to the torches, where that constant pressure is utilized to control a dual regulator which determines the outlet pressures of both gases. These outlet pressures are entirely independent of any pressure drops in the supply lines. This system may be used where existing supply lines do not fullfil the requirements of a centralized pressure control system with regard to pressure drops. It may similarly be used in a new installation in order to permit the use of smaller pipes in long supply lines.

Fig. 6 shows the equipment at the central supply end of the lines. Fig. 7 shows the equipment at one torch. It should be understood that the main acetylene supply line 54 may be connected to several branch acetylene supply lines such as that shown at 82 in Fig. 7. In a similar manner the main oxygen supply line 59 may be connected to several branch oxygen supply lines 83 and the main bleed line 60 of Fig. 6 may be connected to several branch bleed lines 84.

Referring to Fig. 6, there is shown a bleed line 53 connected to the main acetylene supply line 54. A master pilot regulator 55, similar to the pilot regulator 34 of Fig. 4 is connected in the bleed line 53. The pilot regulator 55 regulates the pressure in its outlet pipe 57, and thereby controls a slave pilot regulator 56 through its outlet pipe 57. Outlet pipe 57 is provided with a fixed downstream leak 57a, corresponding to the leak 38a in Fig. 2.

The slave pilot regulator 56 is connected in a bleed line 58 which is supplied from the main oxygen supply line 59. The slave pilot regulator 56 controls the pressure in a pilot line 60. The regulator 56 is similar to the regulators 40 and 41 of Fig. 2, shown in detail in Fig. 5. Since in this system the regulator 55 is not required to compensate for pressure drops between the regulator and the torches, the area of its valve seat should be made as small as possible so as to make it substantially independent of variations in the pressure in the acetylene supply line 54. Regulator 56 is provided with a fixed downstream leak 56a, corresponding to the leak 41a of regulator 41 in Fig. 2.

The pilot tube 60 and its branches 84 supply to each of the several torches oxygen at a fixed pressure. At each torch, this fixed pressure oxygen is supplied to a chamber 69 in a dual regulator shown in Fig. 7.

The pressure in chamber 69 acts on two double diaphragms 70 and 71. Valves 61 and 62 which regulate the flow of oxygen and fuel gas, respectively, are attached to the diaphragms 70 and 71, respectively. The left side of double diaphragm 70 is subject to the regulated oxygen pressure and the right side of double diaphragm 71 is subject to the regulated fuel gas pressure. The valve 61 controls the flow of oxygen to an outlet connection 76 and the valve 62 controls the flow of fuel gas to an outlet connection 77. It will be readily understood that the outlet pressure in the two end chambers of the dual regulator is determined by the control pressure transmitted to its intermediate chamber 69 and in turn determined by the pilot regulators 55 and 56. The fuel gas outlet pressure may conveniently be made slightly larger than the oxygen outlet pressure by making the area of diaphragm 71 subject to the fuel gas outlet pressure smaller than the corresponding area of diaphragm 70 subject to the oxygen outlet pressure, as shown in the drawing.

Two inlet valves 74 and 75 may be connected in the branch supply conduits 83 and 82 ahead of the dual regulator, so that those conduits may be shut off for purposes of inspection, for example.

In normal operation, the master pilot regulator 55 regulates in accordance with its manual setting the pressure of the fluid supplied to slave pilot regulator 56. The slave pilot regulator 56 in turn regulates the control pressure of the fluid supplied through the tube 60 to the compound regulators of the several torches.

If the acetylene supply pressure fails, then the pilot regulator 55 closes, allowing the fluid under pressure in the outlet pipe 57 to flow out through the leak 57a. The pressure in pipe 57 therefore falls, and regulator 56 closes under the influence of its biasing spring, allowing the fluid under pressure in the pilot tube 60 to escape through leak 56a. The pressure in tube 60, its branches 84, and the several chambers 69 therefore falls, and the valves 61 and 62 of the several regulators are closed by their respective biasing springs. In a similar manner, if the oxygen supply pressure fails, the oxygen under pressure in tube 60 escapes through leak 56a and the valves 61 and 62 close.

From the foregoing it may be seen that this system provides substantially constant discharge pressure of both the fuel and the oxygen at the torches. Furthermore, the two gases can be supplied at the torches only if both supplies are under pressure. The pressure of both bases at the torches is entirely independent of any pressure drop in the lines supplying them.

I claim:

1. Pressure regulating apparatus for a combustion supporting gas and fuel gas supply system, comprising a combustion supporting gas supply line, a fuel gas supply line, a first bleed line branching from one of said supply lines, a master pilot regulator for regulating the pressure in a portion of said first bleed line, a second bleed line branching from the other supply line, a slave pilot regulator controlled by the regulated pressure in said first bleed line for regulating the pressure in a portion of said second bleed line, a dual regulator connected in the outlet ends of said supply lines for regulating the outlet pressures of the combustion supporting gas and fuel gas, said dual regulator comprising a housing separated into three aligned chambers by two movable walls, each of the end chambers being connected in one of said supply lines and having a valve therein operated by its associated movable wall for regulating the outlet pressure of the gas supplied from its associated supply line, and means for supplying fluid from said second bleed line under the regulated pressure therein to the one of said three chambers between the two movable walls so that the outlet pressures of both the fuel gas and the combustion supporting gas are determined by the pressure in said one chamber.

2. Pressure regulating apparatus for an oxygen and fuel gas supply system, comprising a main oxygen supply line, a main fuel gas supply line, a first bleed line branching from one of said supply lines, a master pilot regulator for regulating the pressure in a portion of said first bleed line, a second bleed line branching from the other supply line, a slave pilot regulator controlled by the regulated pressure in said first bleed line for regulating the pressure in a portion of said second bleed line, a plurality of pairs of branch supply lines leading from said main supply lines, a plurality of dual regulators, each connected in the outlet ends of a pair of branch supply lines for regulating the outlet pressures therein, each said dual regulator comprising two outlet pressure chambers each connected in one of its associated branch supply lines and having a movable wall and a valve operated thereby for regulating the outlet pressure of the gas supplied from its associated branch supply line, and means for subjecting the opposite sides of both said movable walls to fluid from said second bleed line under the regulated pressure therein so that the regulated outlet pressure of both the fuel gas and the oxygen is determined by the regulated pressure in said second bleed line.

3. Pressure regulating apparatus for a combustion supporting gas and fuel gas supply system, comprising a combustion supporting gas supply line, a fuel gas supply line, a first bleed line branching from one of said supply lines, a master pilot regulator for regulating the pressure in a portion of said first bleed line, a second bleed line branching from the other supply line, a slave pilot regulator controlled by the regulated pressure in said first bleed line for regulating the pressure in a portion of said second bleed line, a dual regulator connected in the outlet ends of said supply lines for regulating the outlet pressures of the combustion supporting gas and fuel gas, said dual regulator comprising two outlet pressure chambers, each connected in one of said supply lines and having a movable wall and a valve operated thereby for regulating the outlet pressure of the gas supplied from its associated supply line, and means for subjecting the opposite sides of both said movable walls to the regulated pressure therein so that the regulated outlet pressures of both the fuel gas and the combustion supporting gas are determined by the regulated pressure in said second bleed line, said movable walls each comprising two spaced diaphragms, means for venting the spaces between the diaphragms to atmosphere, the diaphragm subject to the fuel gas pressure being smaller than the other diaphragms so that the fuel gas outlet pressure is greater than the combustion supporting gas outlet pressure.

4. Pressure regulating apparatus for a combustion supporting gas and a fuel gas supply system, comprising a combustion supporting gas supply line, a fuel gas supply line, a dual regulator for regulating the outlet pressures in the two supply lines, said dual regulator comprising two outlet pressure chambers, each connected in one of said supply lines and having a movable wall and a valve operated thereby for regulating the outlet pressure of the gas delivered from its associated supply line, said movable walls of said pressure chambers being in opposed relation and defining therebetween opposite side walls of a third fluid pressure chamber, means for introducing fluid under a control pressure into said third pressure chamber to thereby regulate the pressure of both the fuel gas and the combustion supporting gas in response to variations in said control pressure, and one of said movable walls having a greater area exposed to the pressure of the fluid introduced into said third chamber so that a predetermined differential is maintained between the outlet pressures of the two supply lines.

References Cited in the file of this patent

UNITED STATES PATENTS

| | | |
|---|---|---|
| 1,095,450 | Cave | May 5, 1914 |
| 1,191,397 | Cave | July 18, 1916 |
| 1,213,159 | Dalen | Jan. 23, 1917 |
| 1,227,881 | Bruckner | May 29, 1917 |
| 1,879,940 | Mangiameli | Sept. 27, 1932 |
| 2,057,150 | Kehl | Oct. 13, 1936 |
| 2,082,227 | Stettner | June 1, 1937 |
| 2,100,978 | Rheinlander | Nov. 30, 1937 |
| 2,270,304 | Jacobsson | Jan. 20, 1942 |
| 2,414,345 | Talley | Jan. 14, 1947 |
| 2,501,957 | Moore | Mar. 28, 1950 |
| 2,583,986 | Bahnson | Jan. 29, 1952 |